(12) United States Patent
Moon et al.

(10) Patent No.: US 10,609,910 B2
(45) Date of Patent: Apr. 7, 2020

(54) CONTRA-ROTATING MULTI-LAYER PROPELLER UNIT FOR MULTI-PHASE FLOW

(71) Applicant: Korea University Research and Business Foundation, Seoul (KR)

(72) Inventors: Young June Moon, Seoul (KR); Dae Han Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 183 days.

(21) Appl. No.: 15/738,273

(22) PCT Filed: Jan. 25, 2017

(86) PCT No.: PCT/KR2017/000914
§ 371 (c)(1),
(2) Date: Dec. 20, 2017

(87) PCT Pub. No.: WO2017/131450
PCT Pub. Date: Aug. 3, 2017

(65) Prior Publication Data
US 2018/0184626 A1 Jul. 5, 2018

(30) Foreign Application Priority Data

Jan. 29, 2016 (KR) .................. 10-2016-0011150
Mar. 30, 2016 (KR) .................. 10-2016-0038322

(51) Int. Cl.
*F04D 7/00* (2006.01)
*A01K 63/04* (2006.01)
(Continued)

(52) U.S. Cl.
CPC .......... *A01K 63/042* (2013.01); *A01K 63/04* (2013.01); *B01F 3/04* (2013.01); *B01F 3/04531* (2013.01); *B01F 7/00* (2013.01); *B01F 7/00341* (2013.01); *B01F 7/06* (2013.01); *C02F 1/40* (2013.01); *C02F 1/74* (2013.01); *C02F 3/12* (2013.01); *C02F 3/20* (2013.01); *C02F 7/00* (2013.01); *F04D 7/045* (2013.01); *F04D 31/00* (2013.01); *B01F 2215/0052* (2013.01); *C02F 2103/20* (2013.01)

(58) Field of Classification Search
CPC ........ F04D 7/00; F04D 19/022; F04D 19/024; F05D 2210/13; F05D 2250/311; F05D 2260/608; C02F 1/74; C02F 3/18
See application file for complete search history.

(56) References Cited

U.S. PATENT DOCUMENTS 2,970,605 A * 2/1961 Sargent .................... F04D 3/00
137/247.41
5,922,262 A * 7/1999 Lagace .................... B29B 9/06
264/142

(Continued)

FOREIGN PATENT DOCUMENTS

DE 4307925 A1 9/1994
EP 1765486 A1 3/2007
(Continued)

OTHER PUBLICATIONS

International Search Report of PCT/KR2017/000914 dated Apr. 28, 2017.
(Continued)

*Primary Examiner* — Ninh H. Nguyen
(74) *Attorney, Agent, or Firm* — Fox Rothschild LLP

(57) ABSTRACT

A contra-rotating multi-layer propeller unit for multi-phase flow according to an exemplary embodiment of the present disclosure includes: a shaft part; a front propeller and a rear propeller connected to the shaft part; an air collection part including a predetermined space therein and the shaft part positioned in the internal space; and an air supply pipe configured to supply air into the air collection part, and a rear propeller blade includes a two-phase blade connected to a rear propeller hub, a layer structure of which an inner surface is connected to an end portion of the two-phase blade, and a single-phase blade positioned at a location corresponding to the two-phase blade on an outer surface of the layer structure.

5 Claims, 8 Drawing Sheets

(51) Int. Cl.

| | | |
|---|---|---|
| *B01F 3/04* | (2006.01) |
| *C02F 1/74* | (2006.01) |
| *B01F 7/00* | (2006.01) |
| *C02F 1/40* | (2006.01) |
| *C02F 3/20* | (2006.01) |
| *C02F 3/12* | (2006.01) |
| *B01F 7/06* | (2006.01) |
| *C02F 7/00* | (2006.01) |
| *F04D 31/00* | (2006.01) |
| *F04D 7/04* | (2006.01) |
| *C02F 103/20* | (2006.01) |

(56) References Cited

U.S. PATENT DOCUMENTS 8,506,811 B2 * 8/2013 Bradley .............. A01K 63/04
119/227

8,992,073 B2 * 3/2015 Lefebvre .............. B01F 3/1221
366/279

2007/0200262 A1 8/2007 Hills
2009/0108501 A1 4/2009 Arcella et al.
2014/0078858 A1 3/2014 Regalbuto et al.

FOREIGN PATENT DOCUMENTS

| JP | H05104089 A | 4/1993 |
| JP | 2006062835 A | 3/2006 |
| KR | 20040007127 A | 1/2004 |
| KR | 10-0459671 B1 | 12/2004 |
| KR | 10-1097197 B1 | 12/2011 |
| KR | 2013-0138917 A | 12/2013 |

OTHER PUBLICATIONS

European Search Report for EP Application No. 17744571.5 dated Mar. 11, 2019.

* cited by examiner

CONTRA-ROTATING MULTI-LAYER PROPELLER UNIT FOR MULTI-PHASE FLOW

TECHNICAL FIELD

The present disclosure relates to a contra-rotating multi-layer propeller unit for multi-phase flow.

BACKGROUND

Due to the rapid depletion of water resources, a study on the system for reprocessing and cleaning contaminated water has been actively conducted. Particularly, in a water processing apparatus such as a water cleaning system, a water mixing apparatus is an essential component for water processing and increases a contact surface between water and oxygen and facilitates the supply of oxygen and thus can maximize the efficiency in reprocessing and cleaning sewage.

Further, if eutrophication causes green or red tide, mass strandings may occur in a fishery or fish farm due to shortage of oxygen supply to creatures in the water. In this case, by mixing water to facilitate the supply of oxygen, such a risk can be suppressed or reduced.

However, a conventional water processing apparatus provides a simple mixing function and thus has a small mixing output, i.e., mixing efficiency, vs. input energy. Therefore, it is difficult to obtain a required effect.

In this regard, Japanese Patent Laid-open Publication No. 2006-062835 (entitled "Propeller, agitating machine, and conveyor") discloses a configuration in which multiple blades are spirally spaced from one another in line on an outer periphery of a rotary shaft, and a front end in a spiral direction of each of blades is crossed with a rear end in the spiral direction of the adjacent blade going forward and a direction of a shaft center of the rotary shaft.

Further, conventionally, a general mixing apparatus added with an aerating apparatus has been used as a mixing and aerating apparatus, and there is a shortage of consideration of aerating flow.

In other words, in the conventional apparatus, a propeller used in a mixer is also used to perform an aerating function, and this propeller is configured without consideration of two-phase flow in which a liquid and a gas are mixed and thus not optimized.

Therefore, in the conventional mixing and aerating apparatus, the use of the same propeller causes deterioration of the aerating function due to a big difference in driving conditions such as density or the like between single-phase flow in which only a liquid is present as a working fluid for driving the mixer and two-phase flow in which a liquid and a gas are mixed for performing mixing and aerating.

DISCLOSURE

Problems to be Solved

The present disclosure is conceived to solve the above-described problem and provides a contra-rotating multi-layer propeller unit for multi-phase flow which is capable of saving energy by differentiating an angle of a propeller blade positioned in a single-phase flow in which a liquid is present from an angle of a propeller blade positioned in a two-phase flow in which a liquid and a gas are mixed and thus improving an aerating function.

Means for Solving the Problems

As a means for solving the above-described technical problem, a propeller unit according to an aspect of the present disclosure includes: a shaft part; a front propeller including a front propeller hub connected to the shaft part and multiple front propeller blades extended in a radial direction of the front propeller hub and equally spaced from each other; a rear propeller including a rear propeller hub connected to the shaft part and multiple rear propeller blades extended in a radial direction of the rear propeller hub and equally spaced from each other; an air collection part including a predetermined space therein and the shaft part positioned in the internal space; and an air supply pipe configured to supply air into the air collection part, and the rear propeller is rotated in a contrary direction to the front propeller and each of the rear propeller blades includes: a two-phase blade connected to the shaft part; a layer structure of which an inner surface is connected to an end portion of the two-phase blade; and a single-phase blade positioned at a location corresponding to the two-phase blade on an outer surface of the layer structure.

Effects

According to any one of the aspects of the present disclosure, a contra-rotating multi-layer propeller unit for multi-phase flow having the above-described configuration according to the present disclosure has the following effects.

Firstly, the contra-rotating multi-layer propeller unit for multi-phase flow according to the present disclosure can provide a propeller structure optimized for water processing mixing pump having a high mixing efficiency (flow rate) with front and rear propellers positioned contrary to each other.

Secondly, the contra-rotating multi-layer propeller unit for multi-phase flow according to the present disclosure can provide an energy-saving propeller unit by differentiating an angle of a propeller blade positioned in a single-phase flow in which a liquid is present from an angle of a propeller blade positioned in a two-phase flow in which a liquid and a gas are mixed and thus improving an aerating function.

Thirdly, the contra-rotating multi-layer propeller unit for multi-phase flow contributes to the development of water processing for which an energy-saving water processing mixing pump is used and thus enables the development of an energy-saving apparatus capable of reducing power cost, and the application thereof may cause a decrease in $CO_2$ emissions.

Fourthly, the contra-rotating multi-layer propeller unit for multi-phase flow is expected to suppress the occurrence of red tide in coastal areas by suppressing eutrophication in the water system and suppress the loss of coastal fishery production base (coastal fish farms), and can also restore soundness of the ecosystem by improving water quality in the water system and thus improve the safety of people's health.

MODE

Figure 1:
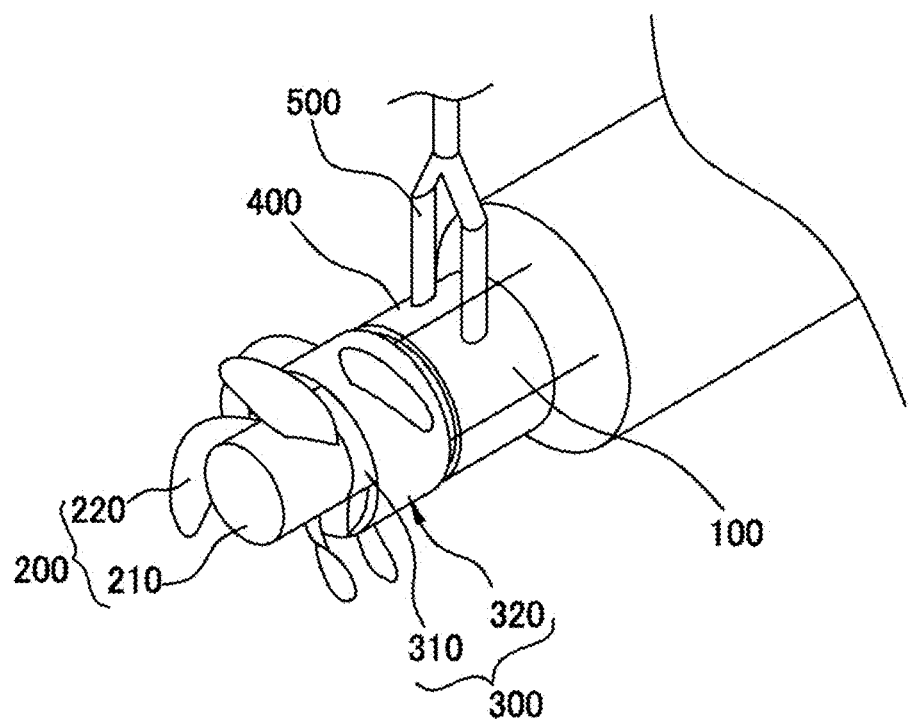
FIG. 1 is a diagram illustrating a contra-rotating multi-layer propeller unit for multi-phase flow.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Hereinafter, a contra-rotating multi-layer propeller unit 10 for multi-phase flow (hereinafter, referred to as "present propeller unit 10") will be described.

Figure 2:
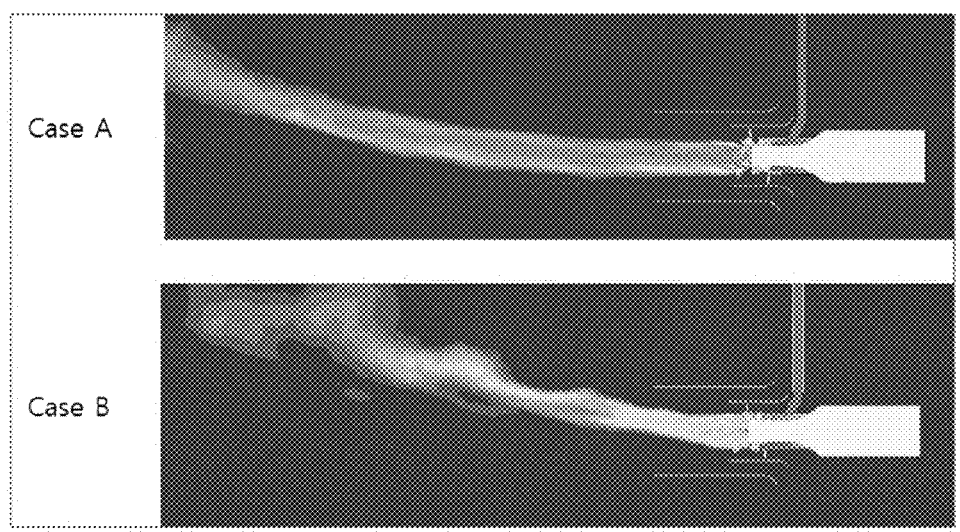
FIG. 2 illustrates air volume fractions of a conventional contra-rotating propeller unit and a contra-rotating multi-layer propeller unit for multi-phase flow.
Figure 3:
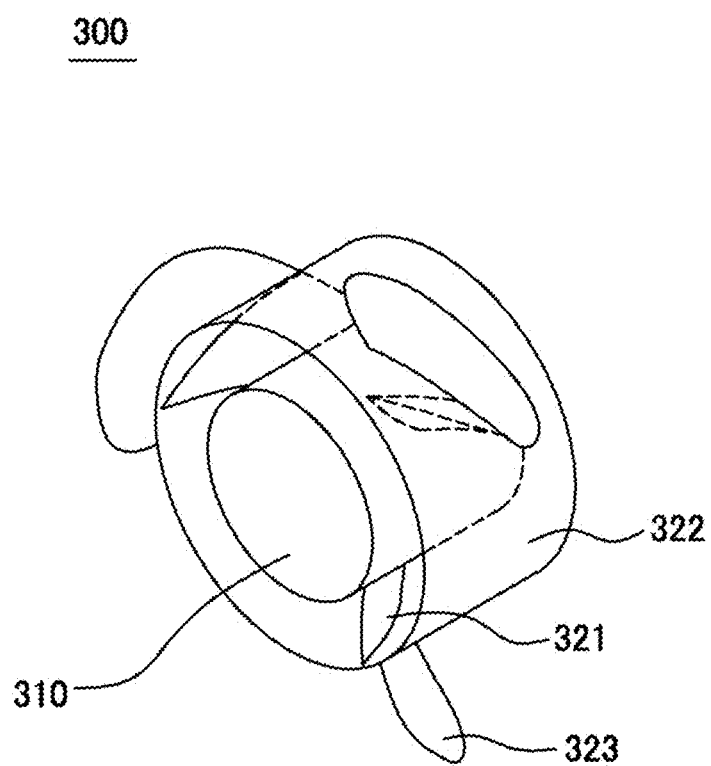
FIG. 3 is a perspective view of a rear propeller.
Figure 4:
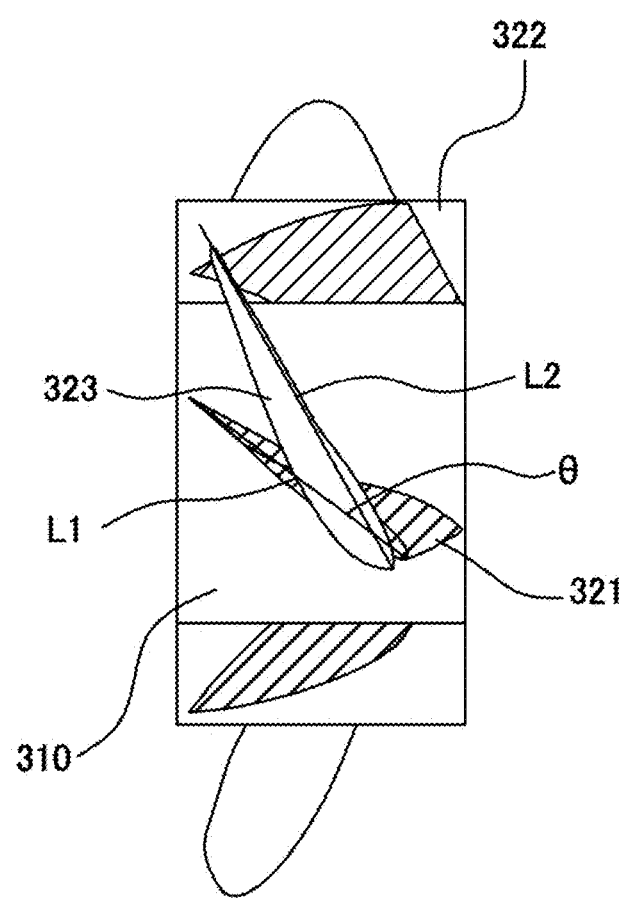
FIG. 4 is a partial cross-sectional view provided to explain shapes of a two-phase blade and a single-phase blade, respectively, of a rear propeller when a mixing ratio of a liquid and a gas is 2:8.
Figure 5:
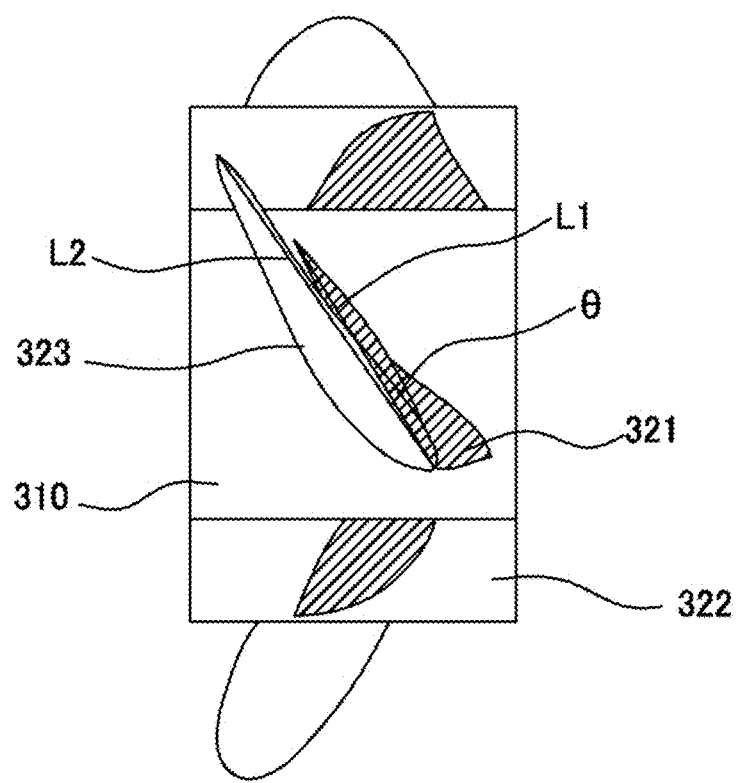
FIG. 5 is a partial cross-sectional view provided to explain shapes of a two-phase blade and a single-phase blade, respectively, of a rear propeller when a mixing ratio of a liquid and a gas is 6:4.
Figure 6:
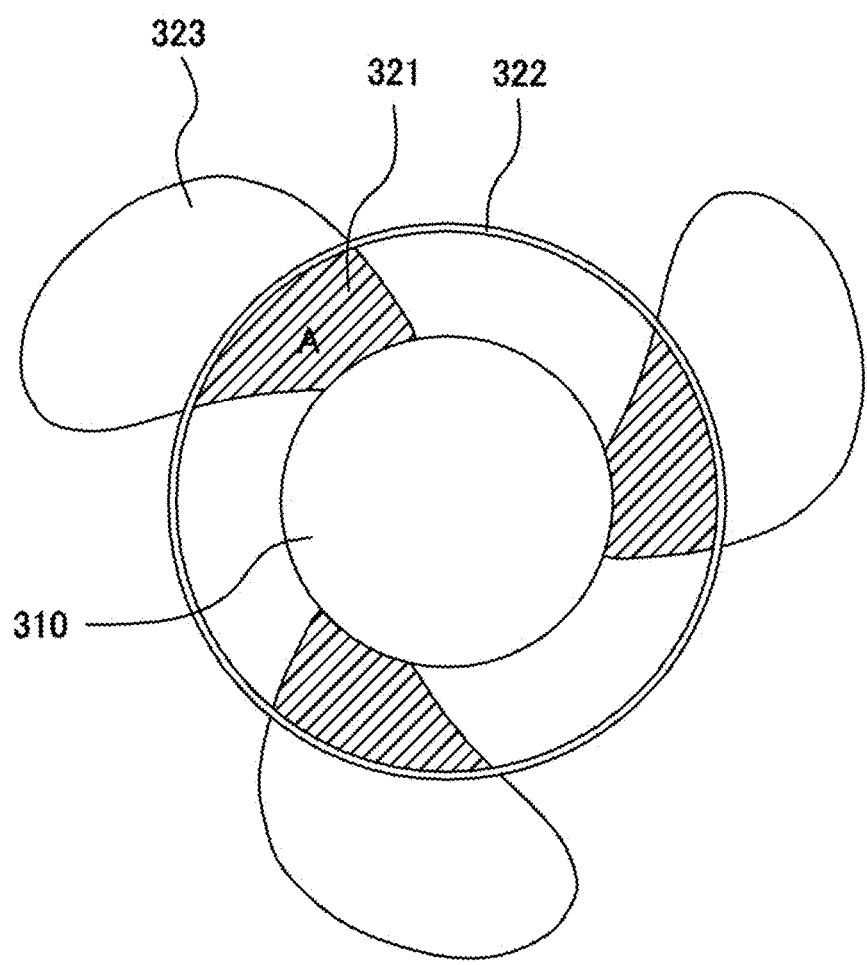
FIG. 6 is a front view provided to explain shapes of a two-phase blade and a single-phase blade, respectively, of a rear propeller when a mixing ratio of a liquid and a gas is 4:6.
Figure 7:
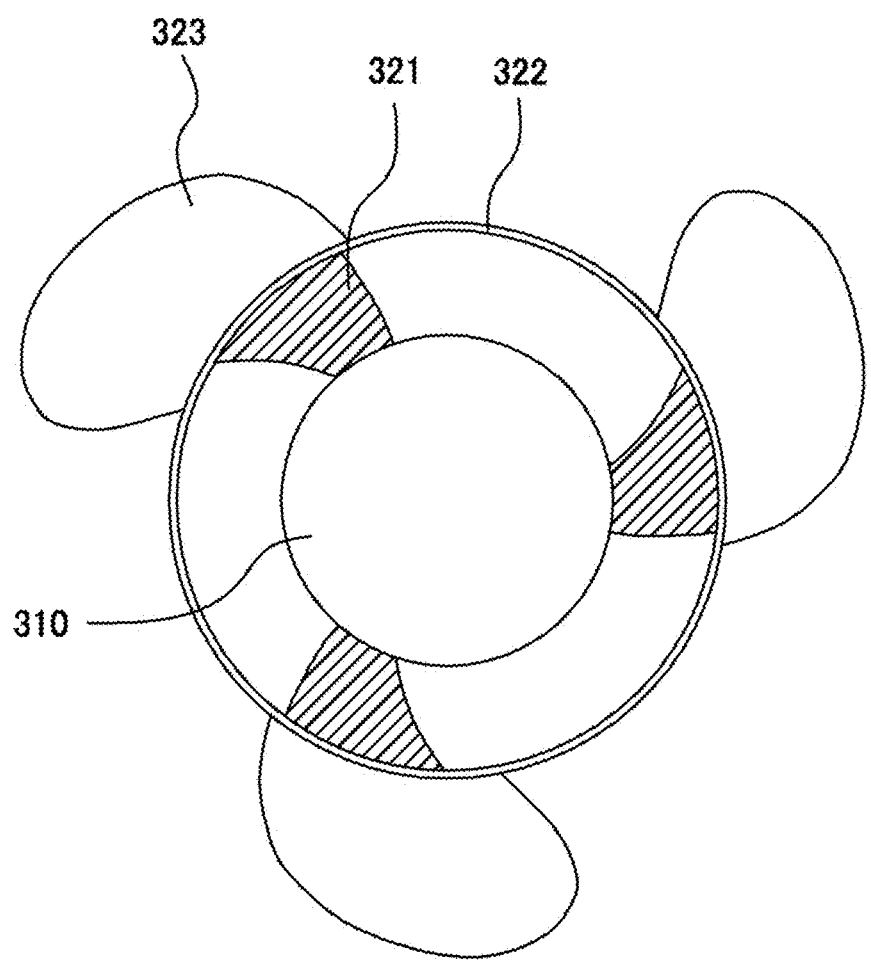
FIG. 7 is a front view provided to explain shapes of a two-phase blade and a single-phase blade, respectively, of a rear propeller when a mixing ratio of a liquid and a gas is 2:8.
Figure 8:
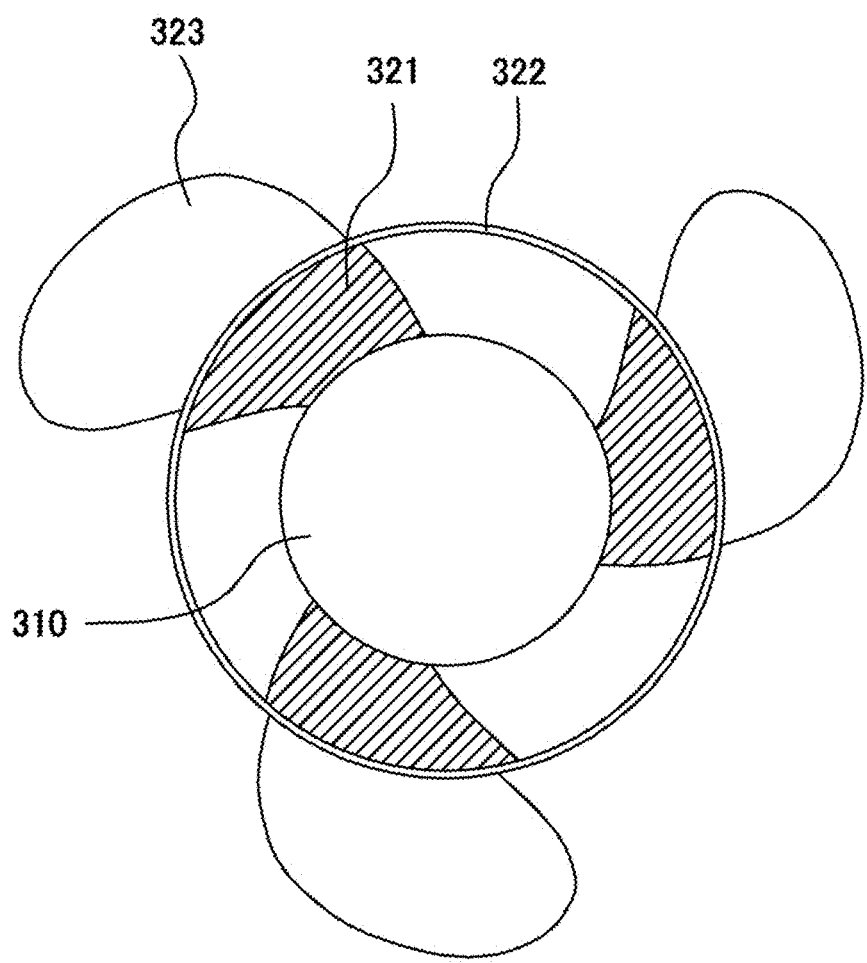
FIG. 8 is a front view provided to explain shapes of a two-phase blade and a single-phase blade, respectively, of a rear propeller when a mixing ratio of a liquid and a gas is 4:6.

FIG. 1 is a diagram illustrating the contra-rotating multi-layer propeller unit 10 for multi-phase flow, FIG. 2 illustrates air volume fractions of a conventional contra-rotating propeller unit 10 and the contra-rotating multi-layer propeller unit 10 for multi-phase flow, FIG. 3 is a perspective view of a rear propeller 300, FIG. 4 is a partial cross-sectional view provided to explain shapes of a two-phase blade 321 and a single-phase blade 323, respectively, of the rear propeller 300 when a mixing ratio of a liquid and a gas is 2:8, FIG. 5 is a partial cross-sectional view provided to explain shapes of the two-phase blade 321 and the single-phase blade 323, respectively, of the rear propeller 300 when a mixing ratio of a liquid and a gas is 6:4, FIG. 6 is a front view provided to explain shapes of the two-phase blade 321 and the single-phase blade 323, respectively, of the rear propeller 300 when a mixing ratio of a liquid and a gas is 4:6, FIG. 7 is a front view provided to explain shapes of the two-phase blade 321 and the single-phase blade 323, respectively, of the rear propeller 300 when a mixing ratio of a liquid and a gas is 2:8, and FIG. 8 is a front view provided to explain shapes of the two-phase blade 321 and the single-phase blade 323, respectively, of the rear propeller 300 when a mixing ratio of a liquid and a gas is 4:6.

Referring to FIG. 1, the present propeller unit 10 includes a shaft part 100, a front propeller 200, and the rear propeller 300, and the front propeller 200 and the rear propeller 300 are rotatably mounted on or connected to the shaft part 100.

The shaft part 100 may be rotated as connected to a driving unit such as a motor.

The front propeller 200 includes a front propeller hub 210 and front propeller blades 220 which are rotated as connected to the shaft part 100.

The front propeller hub 210 is fixed to and mounted on the shaft part 100 and directly linked to rotation of the shaft part 100, but may be linked thereto through a separate linking means.

Further, the front propeller blades 220 are extended in a radial direction of an outer peripheral surface of the front propeller hub 210 and equally spaced from each other.

More specifically, the front propeller 200 includes the front propeller blades 220 extended in a radial direction of the front propeller hub 210 as described above, and the front propeller blades 220 are equally spaced from each other around the front propeller hub 210. That is, the front propeller blades 220 are multiple in number and arranged equiangularly with respect to the front propeller hub 210.

The rear propeller 300 includes a rear propeller hub 310 and rear propeller blades 320 which are rotated as connected to the shaft part 100.

The rear propeller hub 310 is fixed to and mounted on the shaft part 100 and directly linked to rotation of the shaft part 100, but may be linked thereto through a separate linking means.

In other words, the rear propeller hub 310 is connected to the shaft part 100 and may receive a rotational driving force from the shaft part 100. Further, the rear propeller hub 310 may be rotated in a contrary direction to the front propeller hub 210.

Furthermore, the rear propeller blades 320 are extended in a radial direction of an outer peripheral surface of the rear propeller hub 310 and equally spaced from each other.

The rear propeller blade 320 includes a two-phase blade 321, a layer structure 322, and a single-phase blade 323. Details of the rear propeller blades 320 will be described later.

FIG. 1 illustrates a case where three front propeller blades 220 and three rear propeller blades 320 are provided, but the present disclosure may not be limited thereto, and the front propeller blades 220 and the rear propeller blades 320 may be provided differently in number.

The present propeller unit 10 includes an air collection part 400 positioned on one side of the rear propeller 300, i.e., opposite to the front propeller 200 and an air supply pipe 500 configured to supply microbubbles to the air collection part 400. For example, the air supply pipe 500 may have a cross section of honeycomb structure to generate microbubbles.

The air collection part 400 may include a predetermined space therein, and the shaft part 100 may be positioned in the internal space. For example, as illustrated in FIG. 1, the air collection part 400 may be formed into a cylindrical shape, but may not be limited thereto.

Specifically, air discharged through the air supply pipe 500 of honeycomb structure form microbubbles, and the microbubbles are supplied to a liquid to be mixed, and, thus, self-purification for degrading organic materials with microorganisms can be activated and water purification can be carried out in a short time.

The above-described microbubbles may refer to bubbles of 50 μm or less which are not visible to the naked eye. Further, the microbubbles may rise to the surface of water at a very low speed of 0.1 cm/s and can generate ultrasonic waves of 400 Mhz, a high sound pressure of 140 dB, and momentary high heat of about 5,500° C.

The air supply pipe 500 may be a Y-shaped branch pipe as illustrated in FIG. 1, but may not be limited thereto and may be a branch pipe including multiple branch pipes.

Since the microbubbles are supplied to the air collection part 400 through the multiple branch pipes, a difference in vacuum pressure is increased, which may cause improvement in aerating function.

Hereinafter, the present propeller unit 10 will be described by comparison with conventional propeller units.

TABLE 1

| Power [kw] | Type | Air volumetric flow rate [L/min] | Rate of increase |
|---|---|---|---|
| 0.75 (1 HP) | Single | 68.0 | |
| | CRP | 77.6 | Single vs + 14.1 |
| | CRP Layer | 99.00 | Single vs + 45.6 CRP vs + 27.6 |
| 2.2 (3 HP) | Single | 250 | |
| | CRP | 610 | Single vs + 144.0 |
| | CRP Layer | 836 | Single vs + 234.4 CRP vs + 37.0 |

As shown in [Table 1], it can be seen that the present propeller unit 10 (CRP Layer) has an excellent aerating function as compared with a conventional single propeller unit (Single) and a conventional contra-rotating propeller unit (CRP).

Specifically, [Table 1] shows values obtained by comparing the single propeller unit, the conventional contra-rotating propeller unit, and the present propeller unit 10, and a study on 0.75 kw (1 HP) and 2.2 kw (3 HP) was conducted to verify the propeller unit 10.

As shown in [Table 1], it can be seen that when power of 1 HP was transferred to each of the propeller units, the conventional contra-rotating propeller unit was increased in amount of aeration by 14.1% and the present propeller unit 10 was increased by 45.6% as compared with the single propeller unit. Further, it can be seen that when power of 3 HP was transferred to each of the propeller units, the conventional contra-rotating propeller unit was increased in amount of aeration by 144.0% and the present propeller unit 10 was increased by 234.4% as compared with the single propeller unit.

FIG. 2 shows a result of simulation of the conventional contra-rotating propeller unit and the present propeller unit 10 and shows air volume fractions.

Referring to FIG. 2, it can be seen that Case B which is the present propeller unit 10 ejects a greater amount of air through air distribution in a downstream direction of the propeller on a contour than Case A which is the conventional contra-rotating propeller unit.

The rear propeller 300 of the present propeller unit 10 can be applied to the contra-rotating propeller unit (CRP) and can also be applied to the single propeller unit and may play an important role in improving the aerating function at various powers.

Further, the present propeller unit 10 can increase the amount of aeration at the same power and thus may play an important role in a water processing operation which needs to be supplied with a greater amount of oxygen.

The rear propeller blades 320 will be described with reference to FIG. 3 to FIG. 8.

Referring to FIG. 3, the rear propeller blades 320 may divide a working area of the rear propeller 300 into two areas using the layer structure having the same diameter as the air collection part 400.

In other words, the layer structure 322 may divide a two-phase flow area in which a liquid and a gas are mixed from a single-phase flow area in which only a liquid is present, and, thus, it is possible to design propeller blades suitable for the conditions of the respective areas.

Therefore, the rear propeller blade 320 includes the two-phase blade 321, the layer structure 322, and the single-phase blade 323.

The two-phase blade 321 may be provided as extended in the radial direction of the outer peripheral surface of the rear propeller hub 310.

In other words, the two-phase blade 321 may be formed as extended from the outer peripheral surface of the rear propeller hub 310 to an inner peripheral surface of the layer structure 322.

The layer structure 322 may be formed to have the same diameter as the air supply pipe 500 and the inner peripheral surface thereof may be connected to one end of the two-phase blade 321. However, the diameter of the layer structure 322 is not limited thereto and may be slightly greater than that of the air supply pipe 500.

The single-phase blade 323 may be positioned at a location corresponding to the two-phase blade 321 on an outer surface of the layer structure 322. Further, the single-phase blade 323 may be in contact with the layer structure 322 in the same shape as the two-phase blade 321.

As described above, the single-phase blade 323 may be positioned at a location corresponding to the two-phase blade 321, which means a portion of the single-phase blade 323 in contact with the layer structure 322 may be partially overlapped with a portion of the two-phase blade 321 in contact with the layer structure 322.

The single-phase blade 323 may be provided as extended in a radial direction of an outer peripheral surface of the layer structure 322. For example, the single-phase blade 323 may be formed into a shape corresponding to the front propeller blade 220.

The two-phase blade 321 and the single-phase blade 323 may be positioned at predetermined angles, respectively.

Specifically, referring to FIG. 4 and FIG. 5, a straight line connecting a front margin and a rear margin of a cutting plane of the two-phase blade 321 is referred to as a first chord line L1 and a straight line connecting a front margin and a rear margin of a cutting plane of the single-phase blade 323 is referred to as a second chord line L2 and an angle between the first chord line L1 and the second chord line L2 is denoted as θ, and in this case, θ may have a predetermined angle.

Further, referring to FIG. 4, if a volume ratio of a liquid positioned within the layer structure 322 is less than 40%, the two-phase blade 321 may be formed such that the second chord line L2 is positioned in a clockwise direction with respect to the first chord line L1 and θ has an angle of greater than 0°.

FIG. 4 illustrates a shape of the two-phase blade 321 when a mixing ratio of a liquid and a gas is 2:8, and it can be seen that the second chord line L2 of the single-phase blade 323 is rotated in a clockwise direction with respect to the first chord line L1 of the two-phase blade 321 and θ has an angle of 0° or more.

Referring to FIG. 5, if a volume ratio of the liquid positioned within the layer structure 322 is greater than 40%, the two-phase blade 321 may be formed such that the second chord line L2 is positioned in a counterclockwise direction with respect to the first chord line L1 and θ has an angle of less than 0°.

FIG. 5 illustrates a shape of the two-phase blade 321 when a mixing ratio of a liquid and a gas is 6:4, and it can be seen that the second chord line L2 of the single-phase blade 323 is rotated in a counterclockwise direction with respect to the first chord line L1 of the two-phase blade 321 and θ has an angle of less than 0°.

Further, when a mixing ratio of a liquid and a gas is 4:6, θ may be 0°.

Referring to FIG. 6 to FIG. 8, the two-phase blade 321 may have various projected areas depending on a volume ratio of the liquid.

The above-described projected area may refer to an area to which the blade is projected on a plane perpendicular to the shaft part 100.

FIG. 6 is a diagram illustrating shapes of the two-phase blade 321 and the single-phase blade 323, respectively, when a mixing ratio of a liquid and a gas is 4:6.

Referring to FIG. 6, when a mixing ratio of a liquid and a gas is 4:6, the two-phase blade 321 and the single-phase blade 323 may have the same projected area as the front propeller blade 220.

Further, the two-phase blade 321 may have various projected areas depending on a volume ratio of the liquid with reference to a volume ratio of the liquid of 40%.

FIG. 7 is a diagram illustrating shapes of the two-phase blade 321 and the single-phase blade 323, respectively, when a mixing ratio of a liquid and a gas is 2:8.

Referring to FIG. 7, if a volume ratio of the liquid positioned within the layer structure 322 is less than 40%, the two-phase blade 321 may be formed to have a projected area which is smaller than a projected area of the two-phase blade 321 when a volume ratio of the liquid is 40%, i.e., θ is 0°.

FIG. 8 is a diagram illustrating shapes of the two-phase blade 321 and the single-phase blade 323, respectively, when a mixing ratio of a liquid and a gas is 6:4.

Referring to FIG. 8, if a volume ratio of the liquid positioned within the layer structure 322 is greater than 40%, the two-phase blade 321 may be formed to have a projected area which is greater than the projected area of the two-phase blade 321 when a volume ratio of the liquid is 40%, i.e., θ is 0°.

That is, in the present propeller unit 10, the rear propellers 300 are replaced depending on a volume ratio of a liquid passing through the layer structure 322 to regulate θ and a projected area of the two-phase blade 321, and, thus, the aerating function can be improved.

The front propeller blades 200 and the rear propeller blades 320 may have a skewed shape.

Further, the two-phase blade 321 and the single-phase blade 322 may have a skewed shape.

In other words, the present propeller unit 10 may employ skewed blades which are improved in mixing function as compared with vertical blades.

As described above, the contra-rotating multi-layer propeller unit 10 for multi-phase flow provides straight fluid flow force and thus can be used as a mixing part of a water processing apparatus and can also be used as a driving force supplying apparatus for fluid transport. As such, the contra-rotating multi-layer propeller unit 10 for multi-phase flow may have various configurations as long as it is arranged oppositely and thus can increase the straight fluidity and maximize the mixing efficiency.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

| | |
|---|---|
| 10: Propeller unit | |
| 100: Shaft part | |
| 200: Front propeller | |
| 210: Front propeller hub | 220: Front propeller blade |
| 300: Rear propeller | |
| 310: Rear propeller hub | 320: Rear propeller blade |
| 321: Two-phase blade | 322: Layer structure |
| 323: Single-phase blade | |
| 400: Air collection part | 500: Air supply pipe |

We claim:

1. A contra-rotating multi-layer propeller unit for multi-phase flow, comprising:
   a shaft part;
   a front propeller including a front propeller hub connected to the shaft part and multiple front propeller blades extended in a radial direction of the front propeller hub and equally spaced from each other;
   a rear propeller including a rear propeller hub connected to the shaft part and multiple rear propeller blades extended in a radial direction of the rear propeller hub and equally spaced from each other;
   an air collection part including a predetermined internal space therein and the shaft part positioned in the internal space; and
   an air supply pipe configured to supply air into the air collection part, wherein the rear propeller is rotated in a contrary direction to the front propeller, and each of the rear propeller blades includes:
  a two-phase blade connected to the rear propeller hub;
  a layer structure of which an inner surface is connected to an end portion of the two-phase blade; and
  a single-phase blade positioned at a location corresponding to the two-phase blade on an outer surface of the layer structure.

2. The contra-rotating multi-layer propeller unit for multi-phase flow of claim 1, wherein a straight line connecting a front margin and a rear margin of a cutting plane of the two-phase blade is referred to as a first chord line,
  a straight line connecting a front margin and a rear margin of a cutting plane of the single-phase blade is referred to as a second chord line, and
  an angle between the first chord line and the second chord line is denoted as $\theta$,
  wherein an area to which a blade is projected on a plane perpendicular to the shaft part is referred to as a projected area A,
  if a volume ratio of a liquid positioned within the layer structure is greater than 40%, the two-phase blade is formed to have a projected area greater than a projected area of the two-phase blade when $\theta$ is 0°, and
  if the volume ratio of the liquid positioned within the layer structure is less than 40%, the two-phase blade is formed to have a projected area smaller than the projected area of the two-phase blade when $\theta$ is 0°.

3. The contra-rotating multi-layer propeller unit for multi-phase flow of claim 1, wherein the single-phase blade is in contact with the layer structure in the same shape as the two-phase blade.

4. The contra-rotating multi-layer propeller unit for multi-phase flow of claim 1, wherein the air supply pipe is a branch pipe including multiple branch pipes and having a cross section of honeycomb structure.

5. The contra-rotating multi-layer propeller unit for multi-phase flow of claim 1, wherein the two-phase blade and the single-phase blade have a skewed shape.

* * * * *